Dec. 1, 1964    M. G. SANCHEZ ETAL    3,159,408
CHUCK

Filed Oct. 5, 1961    2 Sheets-Sheet 1

INVENTORS
MOISES G. SANCHEZ
VERNON R. HOOVER
BY Kenneth E. Prince
ATTORNEY

Dec. 1, 1964 M. G. SANCHEZ ETAL 3,159,408
CHUCK
Filed Oct. 5, 1961 2 Sheets-Sheet 2

INVENTORS
MOISES G. SANCHEZ
BY VERNON R. HOOVER

Kenneth E. Driver
ATTORNEY

United States Patent Office 3,159,408
Patented Dec. 1, 1964

3,159,408
CHUCK
Moises G. Sanchez, Glen Burnie, and Vernon R. Hoover, Pasadena, Md., assignors to W. R. Grace & Co., New York, N.Y., a corporation of Connecticut
Filed Oct. 5, 1961, Ser. No. 143,171
2 Claims. (Cl. 279—35)

This invention relates to a chuck, and more specifically to a chuck for holding a body, such as a rod or bar, of semiconductor material such as silicon or germanium while it is being subjected to floating zone refining.

Methods and apparatus for preparing hyperpure silicon or germanium bodies have become increasingly important in recent years due to the greatly expanded use of these materials in electrical components, e.g., transistors. One of the most significant developments in this field has been the zone-refining technique which has been fully described in various books, periodicals and patents. In the zone-refining technique as applied to the zone refining of silicon and germanium the usual practice is to surround a body of the relatively impure semiconductor material with an electrically conducting coil, applying radio frequency electrical energy to said coil thereby inductively heating a zone or portion of the body to a temperature above the melting point, and then gradually moving the body and/or the coil with respect to each other whereby to traverse the molten zone through the body of, e.g., silicon, and thus purify the same. In the earlier zone refining methods, the semiconductor body to be treated was placed in a container such as graphite or quartz during treatment. Recent innovations in zone-refining techniques include the floating-zone refining process as described for example in Matare U.S. Patent 2,897,329; and Emeis et al. U.S. Patent 2,904,663. In this process there is no requirement for a container to hold the silicon, and the possibilities of contaminating the silicon product are thus materially reduced.

One of the problems encountered in practicing float-zone refining has been to provide means for properly aligning and securely holding the body of semiconductor material during the refining operation. Another problem has been to provide means and methods for rapidly heating the semiconductor body to temperatures above its melting point and to permit rapid disengagement of the zone refined body from the holder after it has cooled.

It is an object of this invention to provide means for solving the prior art problems noted above. It is a further object to provide chucking means useful in the float-zone refining of rods, bars or other bodies of semiconductor materials such as silicon, germanium or the like. It is a most important object of this invention to provide chucking means for use in the floating-zone refining of semiconductor materials which enables rapid alignment of the body of semiconductor material to be zone refined, ready and rapid coupling of the body to the radio frequency field which melts a zone or portion of the same, and rapid disengagement of the zone refined body from the chucking means after the body has cooled.

It has been found that the above objects, as well as other objects that will be apparent to those skilled in the art in view of the description which follows, can be accomplished by the chucking means described herein. The construction and operation of chucking means of this invention will be fully understood by reference to the drawings attached hereto, in which.

Figure 9:
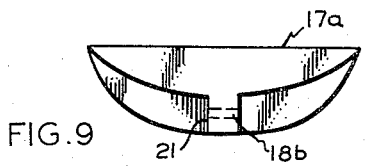
Figure 10:
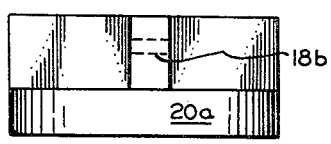
Figure 11:
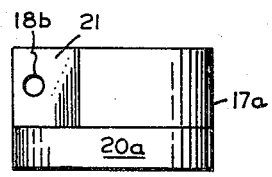
Figure 12C:
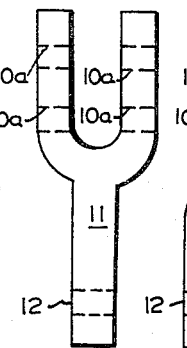
Figures 12B, 12C, 12D:
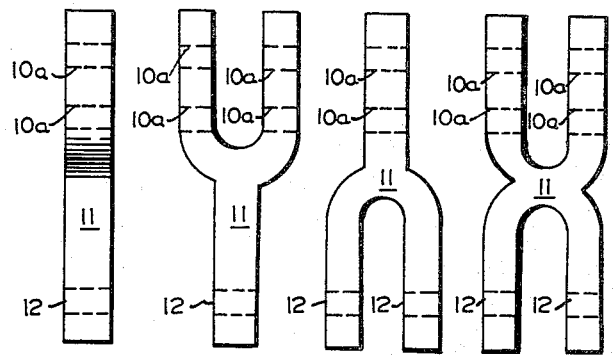

FIGURES 9, 10 and 11 are the top, front and side views, respectively, of another gripping means suitable for use in this invention; and FIGURES 12a through 12d, 13a and 13b illustrate various means of connecting the different parts of the chucking assembly.

Figure 1:
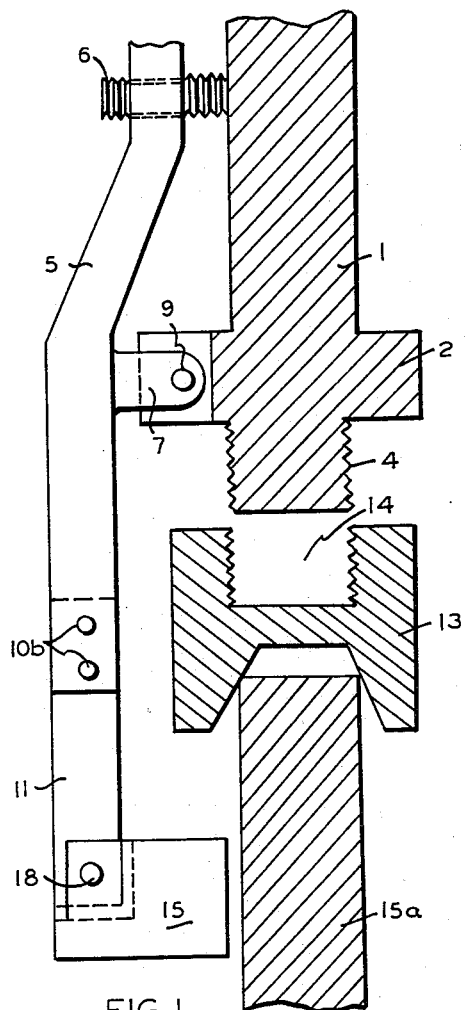
FIGURE 1 is a partial cross section of an assembled chucking means.
Figure 2:
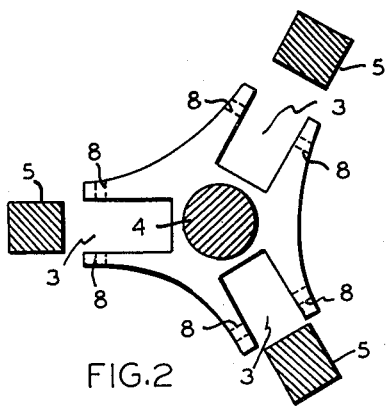
FIGURES 2, 3, 4 and 5 are various possible cross-sectional views taken on the line A—A of FIGURE 1.
Figure 3:
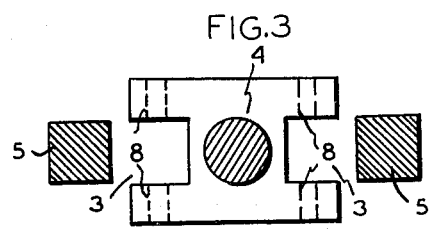

Referring more specifically to the drawings there is shown in FIGURE 1 a cross section of shaft 1, suitably constructed of stainless steel. At the lower end of the shaft there is a widened base 2 which can be of various shapes as shown in FIGURES 2 through 5, and below the base there is a narrower extension for connecting the shaft to the cup 13 which holds the semiconductor body, a portion of which is indicated by 15a. The extension 4 and cup 13 can be connected in any suitable manner. The preferred mode of connection is to provide a threaded female bore 14 in the cup 13 which can be screwed onto and thus secured to a threaded cylindrical male extension 4. The upper end of shaft 1 can be provided with any one of a wide variety of means (not shown) for connecting to the floating-zone scanning device (not shown) to be used.

Figure 4:
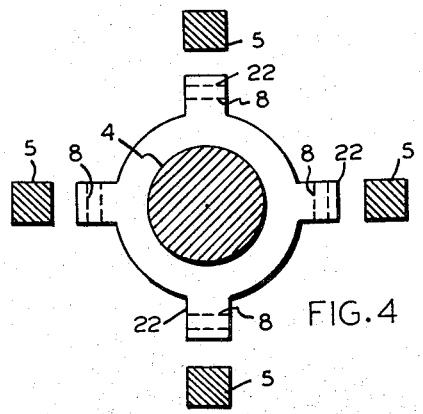
Figure 5:
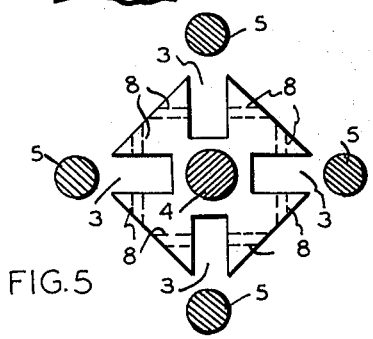

As shown in FIGURES 2 through 5, the base 2 of shaft 1 can take a wide variety of shapes and forms. In all cases, however, the base is provided with a plurality of slots 3 (FIGS. 2, 3 and 5) or fingers 22 (FIG. 4). Apertures 8 are drilled through the fingers 22 or through the projections formed by the slots 3 at a point about midway between the top and bottom of the base 2.

Returning to FIGURE 1, there is also shown an arm 5, having a stud 7 welded thereto, said stud having an aperture 9 drilled therein. Aperture 9 and apertures 8 are located in such a manner as to permit the insertion of a pin (not shown) therethrough when the apertures are in alignment, and thus pivotally connect the arm 5 to the base 2 of shaft 1. As shown in FIGURES 2 through 5, there are a plurality of arms 5 thus pivotally connected to the base 2. These arms may vary in number from 2 to about 6. Any number larger than this is very difficultly disposed about the base 2. The arms 5 are spaced approximately equidistant from each other around the perimeter or diameter of the base 2; i.e., when there are two arms they are about 180° apart; when there are 3 arms they are spaced approximately 120° apart, and so on. Above the pivoted connections formed between studs 7 and slots 3 there is provided, preferably on each arm 5, an adjusting means 6 for varying the distance between the ends of the arms 5 and the centerline of shaft 1. In the specific device shown the adjusting means 6 is a set screw although it will be obvious to those skilled in the art that other adjusting means such as wedges, springs and the like may be used if desired.

Figures 13A, 13B:
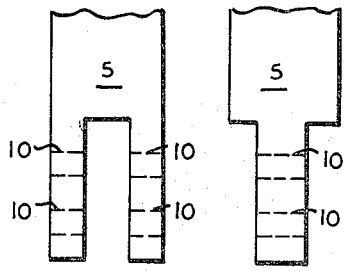

At the lower end of arms 5 there is a yoke or an extending finger as shown in FIGURES 13a and 13b respectively, through which there is drilled a pair of apertures 110. An extension arm 11, having corresponding apertures 10a (see FIGURES 12a–12d) is rigidly connected to each of the arms 5 by means of pins, screws, bolts or the like (indicated at 10b in FIGURE 1) extending through the apertures 10 and 10a. The extension arms 11 terminate at a point below the bottom of cup 13 and are provided at their lower end with yokes or fingers (FIGURES 12a through 12d) through which there are drilled apertures 12. Gripping means (indicated generally by 15 in FIGURE 1) for holding the semiconductor body during the floating zone refining are pivotally connected to the lower end of extension arms 11 by means of a pin, screw or the like, shown at 18 (FIGURE 1).

Figure 6:
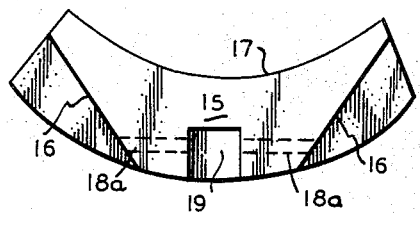
FIGURES 6, 7 and 8 are the top, front and side views, respectively, of one of the gripping means useful in this invention.
Figure 7:
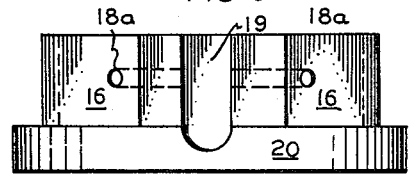
Figure 8:
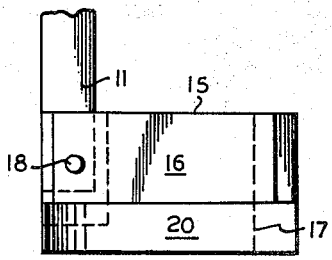

Several suitable embodiments of gripping means 15 are more fully shown in FIGURES 6 through 11. In FIGURES 6, 7 and 8 the gripping means 15 is shown as comprising a base portion 20, a top portion having tapered sides 16 and a cavity 19 which accommodates the extending finger (see FIGS. 12a and 12b) of extension arm 11 as fully shown in FIGURES 1 and 8. Apertures 18a are drilled through the tapered top portion of the gripping means 15 and communicate with the cavity 19, whereby a pin 18 or similar device inserted through apertures 18a and 12 will pivotally connect the extension arm 11 and the gripping means 15, as described above. The gripping means 15 has a gripping face 17 which is designed to adjust to and securely clamp the body of semiconductor material 15a. As shown in FIGURE 6, the face 17 is curved to fit a cylindrical body of semiconductor material. In FIGURE 9, the gripping face 17a is designed to grip a square or rectangularly shaped body on the flat faces of such body. Other modifications of the shape of face 17 are also apparent and the two specific embodiments shown are not to be deemed all-inclusive. In FIGURES 9, 10 and 11, the gripping means 15 is shown as having rearwardly of the gripping face 17a and above the base portion 20a a stud 21 (best shown in FIGURES 9 and 11) which can be connected to yokes (see FIGURES 12c and 12d) on the lower end of extension arm 11 in the same manner as previously described.

The chuck assembly of this invention is preferably constructed from materials which will not contaminate the semiconductor body to be refined. Suitable materials for this purpose are tantalum and molybdenum which are capable of operating at the high temperatures required and yet retain good mechanical properties and chemical inertness to the semiconductor body at these temperatures.

If desired all parts of the chuck assembly, except the cup 13 and gripping means 15 which are preferably made of tantalum, can be made of e.g., stainless steel. The use of tantalum for the cup and gripping means limits contamination of the semiconductor body and also because of the electrical conductivity of tantalum permits quick heating and rapid coupling of the semiconductor body to the radio frequency field used to form the molten zone therein. Use of the non-contaminating electrically conducting gripping means thus eleminates the prior art problems (see e.g., Matare U.S. Patent 2,897,329—Col. 3, line 30 et seq.) encountered in attempting to heat the semiconductor body to be refined by the floating-zone technique up to its melting point.

It is obvious that many variations of the chuck assembly shown and described above are possible. Thus for example the connection between arm 5 and base 2 can be achieved by use of a yoked stud 7 and fingers 22 (FIGURE 4) as well as by the connection between simple stud 7 and notches 3 shown in FIGURES 1 and 2. If desired the cup 13, instead of being a separate piece, may be machined in the lower extension 4 of the shaft 1, and thus be an integral part of the shaft. Furthermore, it is feasible to eliminate extension arm 11 simply by increasing the length of pivoted arm 5 to a point beyond which the cup 13 will interfere with the establishment of gripping contact between the semiconductor body 15a and gripping means 15. As previously noted the specific number of the plurality of arms 5 and associated gripping means 15 can be varied to a great degree, the only limiting factor being the space required to avoid interference of the gripping means with each other. Preferably the number of arms and gripping means is between 2 and 4. Variations in radial dimensions or in overall length of the assembled chuck and semiconductor body which may be required in adapting the assembly for use in any particular type of floating-zone scanning device can be accomplished in known manner. All such variations, as well as others that would be obvious to a skilled mechanic are deemed to be within the spirit and scope of this invention.

Operation of the chuck assembly is believed obvious from the foregoing description and hence does not require extended discussion. Basically, the assembly and use is as follows, the cup 13 is connected to extension 4 and a body (a rod for example) of semiconductor material such as silicon inserted therein. The desired number of assembled arms 5, extension arms 11 and gripping means 15 are then pivotally connected to the base 2 of shaft 1. The gripping faces 17 are swiveled to loosely fit the surface of the silicon rod. The adjusting means 6 on each arm 5 is then manipulated so as to align the rod in the desired manner and to secure a tight fit between gripping faces 17 and the rod. The shaft 1 is connected as may be required to the floating zone scanner (not shown) and the assembled chuck and silicon rod disposed so that the gripping means 15 are from about ⅛ inch to about ¼ inch from the radio frequency coil (not shown) used in the floating-zone refining of silicon body. When power is supplied to the coil, the silicon, because of its poor electrical conductivity at low temperatures, does not couple directly with the radio frequency field. However, the tantalum or molybdenum gripping means 15 will, because of their metallic character, couple with the radio frequency field and quickly heat to glowing. The pin or bolt connection 18a between the gripping means 15 and extension arm 11 is a very poor heat transfer point, and thus most of the heat created by the glowing gripping means is transferred to the silicon rod with little or negligible loss of heat by transference to the extension arms, which are not heated to the glowing point during operation. When the silicon rod is heated to a temperature at which the silicon becomes a good electrical conductor, the radio frequency field becomes directly coupled with the rod which can then be heated to its melting point after which the floating-zone refining operation can be commenced.

Two chucks, one constructed for the most part from tantalum and the other constructed from stainless steel except for the use of tantalum gripping means, cup, extension arms 11 and connecting pins 18, have been satisfactorily used in a wide-chamber type floating zone scanner for periods of several months. Both of these chucks were designed in such manner as to minimize as much as possible the overall chuck length which is of importance in the wide-chamber scanners because of the limited length of the floating zone pass. No difficulties have been encountered in using these two chucks.

Six chucks having three pivoted arms 15 and associated gripping means all designed so as to provide minimum radial dimensions, have been constructed for use in a commercial tube-type floating zone scanner. These chucks have been satisfactorily used for periods of up to several months with no serious operating difficulties. Silicon rods can be aligned and tightly secured in the chuck assembly in times on the order of one minute. Direct coupling of the silicon rod with the radio frequency field has been achieved in time periods as short as two minutes after the radio frequency power was first supplied to the coil. After the refining operation is completed, the rods which have been cooled can be removed from the chuck assembly in less than one minute. Use of tantalum or molybdenum gripping means in these chucks has resulted in no significant contamination of the silicon rods, with analyses of the refined rods showing as low as 0.1 part per billion of electrically active impurities.

What is claimed is:

1. In chuck for aligning and securely holding the body of a semiconductor material during the floating-zone refining of said semiconductor material said chuck comprising a shaft having at one end a widened base portion, a cup below said base portion adapted to receive the end of said semiconductor material to be held in the chuck assembly, a plurality of arms pivotally connected to said base portion and extending above said base portion and at least below said cup; adjusting means at upper extension of said arms for varying the distance between the ends of the arms and the centerline of said shaft, and gripping means pivotally connected to the lower extension of said arms below the cup, the improvement in which said cup and said gripping means consists of tantalum.

2. The apparatus according to claim 1 in which the semiconductor material is selected from the group consisting of silicon and germanium.

References Cited by the Examiner

UNITED STATES PATENTS

| 576,979 | 2/97 | Gregory | 279—109 X |
|---|---|---|---|
| 675,636 | 6/01 | McCahey | 279—108 X |
| 913,594 | 2/09 | Wehner | 279—108 X |
| 2,809,905 | 10/57 | Davis | 279—23 |
| 2,972,525 | 2/61 | Emeis | 279—23 |

ROBERT C. RIORDON, *Primary Examiner.*

KARL J. ALBRECHT, *Examiner.*